C. M. GARVIN.
MACHINE FOR ELECTRICALLY WELDING THE CALK OR TOE PIECE UPON HORSESHOE BLANKS.
APPLICATION FILED MAY 18, 1915. RENEWED JUNE 21, 1919.

1,329,520.

Patented Feb. 3, 1920.

C. M. GARVIN.
MACHINE FOR ELECTRICALLY WELDING THE CALK OR TOE PIECE UPON HORSESHOE BLANKS.
APPLICATION FILED MAY 18, 1915. RENEWED JUNE 21, 1919.

1,329,520.

Patented Feb. 3, 1920.
3 SHEETS—SHEET 2.

C. M. GARVIN.
MACHINE FOR ELECTRICALLY WELDING THE CALK OR TOE PIECE UPON HORSESHOE BLANKS.
APPLICATION FILED MAY 18, 1915. RENEWED JUNE 21, 1919.
1,329,520.
Patented Feb. 3, 1920.
3 SHEETS—SHEET 3.
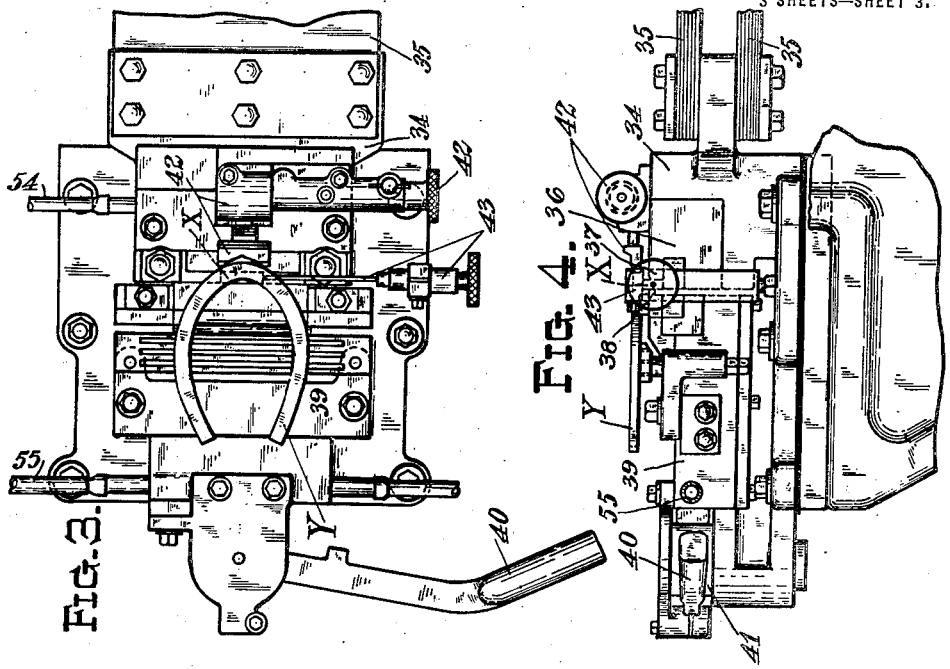

UNITED STATES PATENT OFFICE.

CYRUS M. GARVIN, OF PITTSBURGH, PENNSYLVANIA, ASSIGNOR TO COPPER-DIE HORSESHOE COMPANY, OF PITTSBURGH, PENNSYLVANIA, A CORPORATION OF PENNSYLVANIA.

MACHINE FOR ELECTRICALLY WELDING THE CALK OR TOE-PIECE UPON HORSESHOE-BLANKS.

1,329,520.      Specification of Letters Patent.      Patented Feb. 3, 1920.

Application filed May 18, 1915, Serial No. 28,859. Renewed June 21, 1919. Serial No. 305,913.

*To all whom it may concern:*

Be it known that I, CYRUS M. GARVIN, a citizen of the United States, residing at Pittsburgh, in the county of Allegheny and State of Pennsylvania, have invented a new and useful Improvement in Machines for Electrically Welding the Calk or Toe-Piece Upon Horseshoe-Blanks, of which improvement the following is a specification.

My invention relates to improvements in machines for electrically welding the calk or toe piece upon horse shoe blanks.

The object of my invention is to produce a simple and efficient machine of the character specified, which is adapted to be adjusted to operate upon any required size of horse shoe. I accomplish this object by means of the device hereinafter more specifically described, reference being had to the accompanying drawings, forming part hereof, in which—

Fig. 3 is a plan view of a part of the mechanism on the line 1—1 of Fig. 1.

Fig. 4 is a side elevation of the same.

Figure 1:
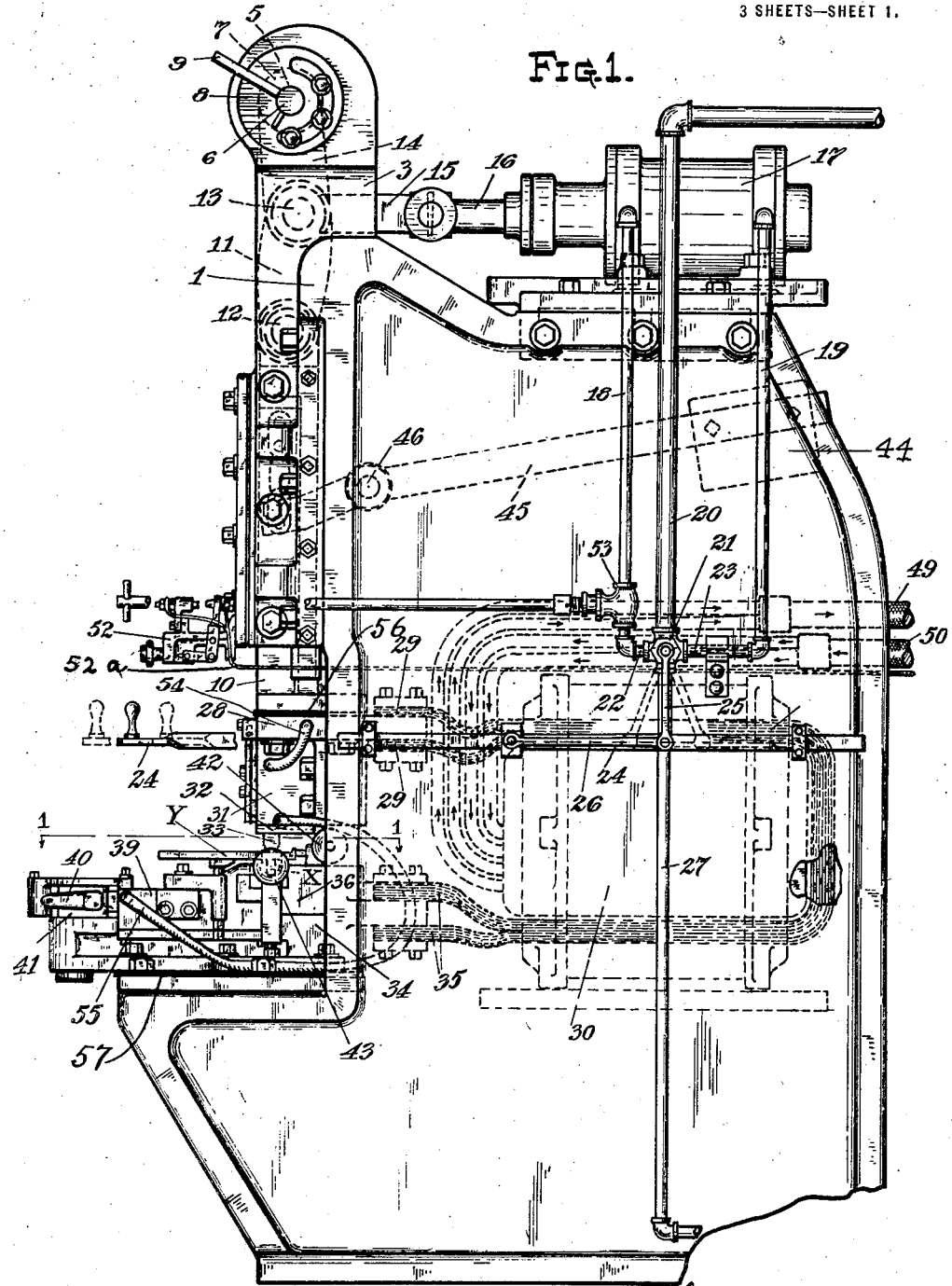
Figure 1 is an end view of my improved horse shoe calk welding machine.
Figure 2:
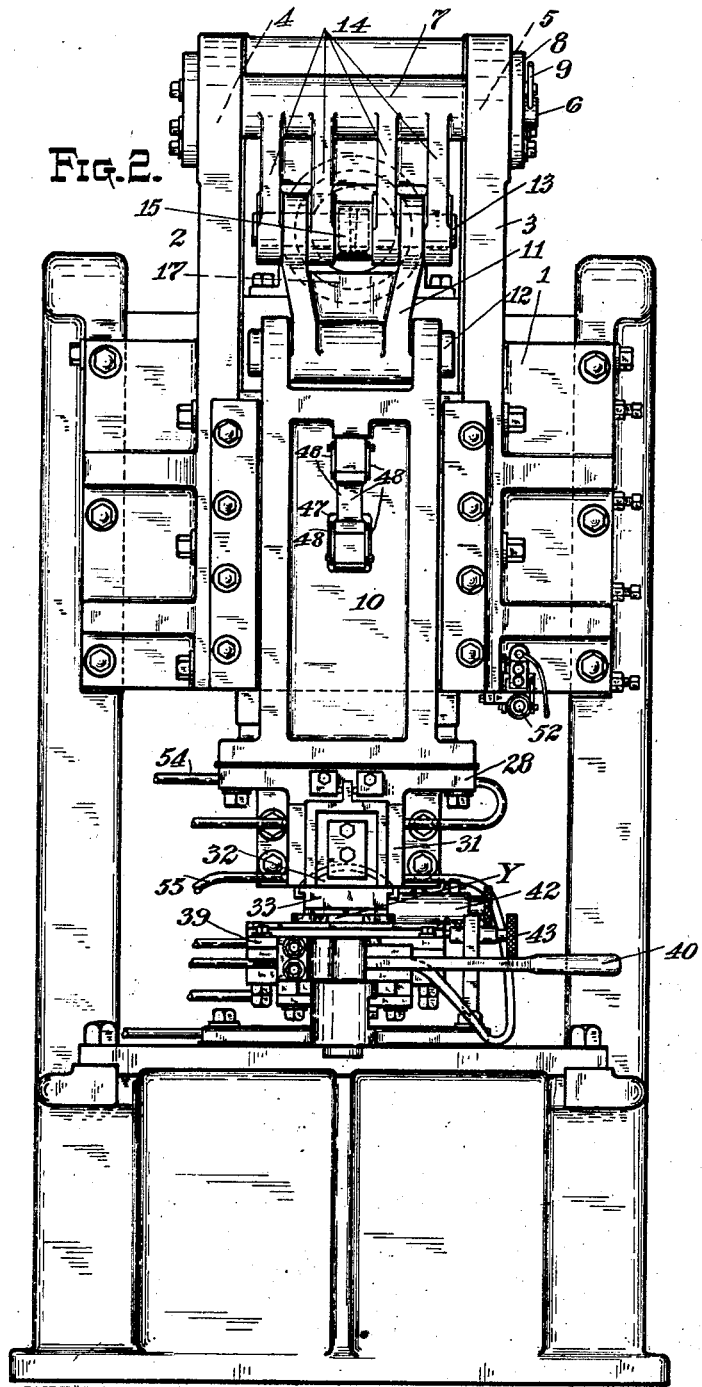
Fig. 2 is a front elevation of the same.

Referring to said drawings, 1, is a frame in which the operative parts of the apparatus are supported. The upper front portion of the frame is provided with two parallel upwardly extending posts or pillars, 2, 3, in the upper ends of which are formed bearings, 4, 5, for the shaft 6. A thimble or sleeve, 7, surrounds said shaft, being rigidly fixed thereto. The shaft is adapted to be adjusted up and down by the cam, 8, and lever, 9, in order to regulate the travel of the sliding block or movable member, 10, which is connected to said sleeve by means of the clevis connection or yoke, 11, the lower end of which is pivotally mounted on a pin or rod, 12, the ends of which are journaled in the upper end of said sliding member. The upper end of said yoke is mounted on the rod, 13, upon which are also mounted the downwardly projecting members, 14, of the sleeve, 7. Upon said shaft or rod, 13, is mounted one end of the link, 15, the opposite end thereof being connected to the piston, 16, of the pressure cylinder, 17, which is supported upon the top of the frame. The piston of the cylinder and its connections is adapted to move the sliding member, 10, up and down for the purpose hereinafter set forth whenever fluid, preferably oil under pressure, is admitted alternately to the ends of said cylinder through the pipes, 18, 19. The said pipes are connected, respectively, to a four-way valve, 21, which is located in the supply pipe, 20, by means of the short pipes, 22, 23. The said valve, 20, is controlled by the manually operated lever, 24, which is connected to the valve lever, 25, by means of the rod, 26. Pressure is alternately admitted to the ends of said cylinder through the pipes, 18, 19, and exhausted through the pipe, 27. The said reciprocating member, 10, has secured to the lower end thereof the upper main die block, 28, which is connected to the laminated conductor windings of the secondary coils, 29, of the transformer, 30. 31 is a shoe die block secured to said upper main die block, the said shoe die block having secured thereto a swivel plate, 32, to which is secured the shoe die, 33.

Immediately below said shoe die and secured in the front frame of the machine, is the lower main die block, 34, which, like the upper main die block, is connected to the secondary windings of the transformer by means of the laminated conductors, 35. The upper portion of the lower main die block carries the stationary portion, 36, of the toe die and also the back portion, 37, of the sub toe-die. The toe calk, X, rests upon the stationary part of the toe die between the back part of the sub toe-die and the front part, 38, of the sub toe-die. 39, is the movable portion of the toe die, which is adapted to be reciprocated by means of the lever, 40, which controls the cam, 41, which is mounted in the forward part of the lower main die block.

The shoe blank, Y, is supported upon the movable portion of the toe die and is carried forward by the cam, 41, when operated by said lever, 40, and is positioned beneath the shoe die by means of the shoe adjuster, 42. The toe calk, X, is also adapted to be positioned by means of the toe calk adjuster, 43. 44, is a counterweight upon the long lever arm, 45, which is pivotally mounted upon the rod or shaft, 46, secured in the side of the frame, the forward end of the lever passing through the recess, 47, formed in the movable member, whereby said counterweight assists in the upward movement of said member. A number of links, 48, serve to connect said movable member and said lever in such wise that the swing of the lever is taken up by the links and the movement of the movable member is entirely vertical. 49 and 50 are cables which are connected to the primary windings of the induction coil, 30, and serve to convey current from a source of electric current (not shown) to said transformer, whereby an induced current is set up in said secondary windings and carried by said windings to the upper main die block, through the same to the shoe to the lower main die block and back to the coil by means of the conductors connected to the lower die block. 52, is a switch which controls the current leading from the source of supply thereto through the line, 52ª, for the purpose of controlling a switch (not shown) in the main line between the induction coil and the transformer (not shown) for the purpose of controlling the current through the primary windings in the induction coil. 53 is a casing which contains a check valve in the pipe, 18, which is adapted to control the admission of fluid to that end of the cylinder independent of the four-way valve. 54, 55, are water conduits, which are adapted to convey water to and through the die blocks, for the purpose of keeping the same cool. The die blocks connected with the secondary windings are insulated from the remaining parts of the apparatus by the insulating material, 56, 57.

In the operation of the device the vertically reciprocating member 10 is elevated, a toe calk X placed upon the stationary part of the toe die between the back portion 37 of the sub toe die and the front portion 38 thereof, and a shoe blank Y placed upon the movable portion 39 of the toe die. The shoe blank is then moved rearwardly by manipulating the lever 40 and properly positioned beneath the shoe die by means of the shoe adjuster 42. The toe calk X is also properly positioned by means of the toe calk adjuster 43. With the parts thus properly positioned, the lever 24 is manipulated to operate the four-way valve 21 and admit fluid to the pressure cylinder 17, thereby causing the piston 16 of said cylinder to move the vertically reciprocating member 10 downwardly until the upper shoe die 33 is in a firm engagement with the shoe blank. The electric current is then thrown on by manipulating the switch 52, thereby causing a high tension current to pass to and through the shoe blank and toe calk for the purpose of welding the two members together. The current is then shut off and the member 10 moved upwardly to release the shoe blank.

Having described my invention, what I claim and desire to secure by Letters Patent, is:

1. In a machine for welding the toes upon horseshoes, the combination of a frame, a vertically reciprocable member supported in said frame, an upper main die block carried by said member, a lower main die block provided with a toe die having a stationary portion and a movable portion, one of the said portions receiving the shoe blank and supporting it under the upper main die block, means for positioning a calk relative to the shoe blank, and means for conveying an electric current to and through the said shoe blank and calk for the purpose of welding the shoe blank and calk together.

2. In a machine for welding the toes upon horse shoes, the combination of a frame, a vertical reciprocable member supported in said frame, a die block carried by said member, a horizontally disposed reciprocating member carrying a die block, means for positioning a shoe blank upon said horizontally disposed member, means for positioning the calk or toe with reference to said block, and means for conveying an electric current to and through the said die block and blank for the purpose of welding the said toe to said shoe blank.

3. In a machine for welding the toes upon horse shoes, the combination of a frame, a pressure cylinder mounted in said frame, a vertical reciprocable member supported in said frame, means to connect said member to the piston of said cylinder, a die block carried by said member, a horizontally disposed reciprocating member carrying a die block, means for positioning the shoe blank upon said horizontally disposed member, means for positioning the calk or toe with reference to said block, means for supplying fluid to the ends of said cylinder alternately, and means for conveying an electric current to and through the die blocks for the purpose of welding the toe upon said blank.

4. In a machine for welding the toes upon horse shoes, the combination of a frame, a pressure cylinder mounted in said frame, a transformer mounted in said frame, a vertical reciprocating member, means to connect the same with the piston of said cylinder member, a die block carried by said member, a horizontally disposed reciprocating member carrying a die block and means for connecting the secondary windings of said transformer with said die blocks.

5. In a machine for welding the toes upon horseshoes, the combination of a frame, a vertically reciprocable member supported in said frame, an upper main die block carried by said member, a lower main die block provided with a toe die having a stationary portion and a movable portion, said movable portion receiving the shoe blank, means for adjusting the movable portion to position the shoe blank under the upper main die block, means for receiving and positioning a calk relative to the shoe blank, and means for conveying an electric current to and through the said shoe blank and calk for the purpose of welding the shoe blank and calk together.

In testimony whereof, I have hereunto signed my name in the presence of two subscribing witnesses.

CYRUS M. GARVIN.

In the presence of—
JOHN H. RONEY,
CLARENCE A. WILLIAMS.